United States Patent [19]

Ailey, Jr.

[11] Patent Number: 4,813,102

[45] Date of Patent: Mar. 21, 1989

[54] BUTCHERING SAW

[75] Inventor: Harrison A. Ailey, Jr., Knox County, Tenn.

[73] Assignee: Acraloc Corporation, Oak Ridge, Tenn.

[21] Appl. No.: 104,835

[22] Filed: Oct. 5, 1987

[51] Int. Cl.⁴ .............................................. A22B 5/20
[52] U.S. Cl. ........................................................ 17/23
[58] Field of Search ...................... 17/23; 30/388, 276; 83/733

[56] References Cited

U.S. PATENT DOCUMENTS

| 474,233 | 5/1892 | Edwards | 83/733 |
|---|---|---|---|
| 1,409,741 | 3/1922 | Lindemon | 83/733 |
| 3,270,369 | 9/1966 | Mandell | 17/23 |

Primary Examiner—Willie G. Abercrombie
Attorney, Agent, or Firm—Pitts and Brittian

[57] ABSTRACT

A butchering saw (10) particularly suited for splitting hogs is provided. The saw (10) includes a cutting blade (70) which rotates in the preferred embodiment. A drive shaft (48) is provided which has a power take-off location at one end (50) operatively associated with the blade. A motor (38) serves to rotatably drive the drive shaft (48) for turning the blade and performing the cutting operations. A driving mass mechanism (86) is carried by the drive shaft (48) to assist in maintaining a constant motion of the drive shaft during butchering operations in which the blade (70) cuts through soft tissue and bone which apply varying resistances or loads to the cutting motions.

8 Claims, 3 Drawing Sheets

BUTCHERING SAW

DESCRIPTION

1. Technical Field

This invention relates to butchering saws and more particularly concerns a butchering saw suitable for use as a hog splitter for dissecting or splitting hogs.

2. Background Art

Butchering devices and saws for splitting large animals such as hogs have long been known in the art. Conventionally, such devices are hydraulically driven such that a cutting blade engages the hog during cutting operations. As the blade moves through the soft tissue and hard portions, such as bones, of a hog, the load level on the blade and its operatively associated drive motor varies substantially. Thus, in butchering saws powered by hydraulic pressure generating motors, the hydraulic pressure varies substantially, which increases the deleterious effect on the motor. For example, it has been noted during hog splitting operations that the hydraulic pressure indicating needle swings widely during movement of the cutting blade through soft tissue and bone. The pressure peaks produced by the alternating blade loads increase the wear on the drive motor and substantially reduce the useful life of the hog splitters and/or their components.

Accordingly, it is an object of the present invention to provide an improved butchering saw which is particularly suitable for splitting hogs.

It is another object of the present invention to provide such an improved butchering saw which incorporates a mechanism that assists in maintaining a constant motion/momentum of the drive shaft during butchering operations in which the blade load varies as is occasioned by cutting through soft tissue and bone.

Yet another object of the present invention is to provide such a butchering saw incorporating a drive mass mechanism operatively associated with the drive shaft of the saw which reduces the pressure peaks required of the hydraulic drive motor as the blade loads substantially vary.

DISCLOSURE OF THE INVENTION

Further objects and advantages will be accomplished by the present invention which provides an improved butchering saw particularly suitable for splitting hogs. The butchering saw of the present invention includes a cutting blade which rotates in the preferred embodiment. A drive shaft has a power take off location at one end which is operatively associated with the blade. As the drive shaft rotates, rotary motion is imparted to the cutting blade. This drive shaft is rotatably driven by a hydraulic motor in the preferred embodiment. A drive mass mechanism is carried by, or operatively associated with, the drive shaft to assist in maintaining a constant motion/momentum of the drive shaft during butchering operations in which the blade load varies as it cuts through soft tissue and bone.

BRIEF DESCRIPTION OF THE DRAWINGS

The above-mentioned features of the present invention will become more clearly understood from the foregoing detailed description read together with the drawings in which.

BEST MODE FOR CARRYING OUT THE INVENTION

Figure 1:
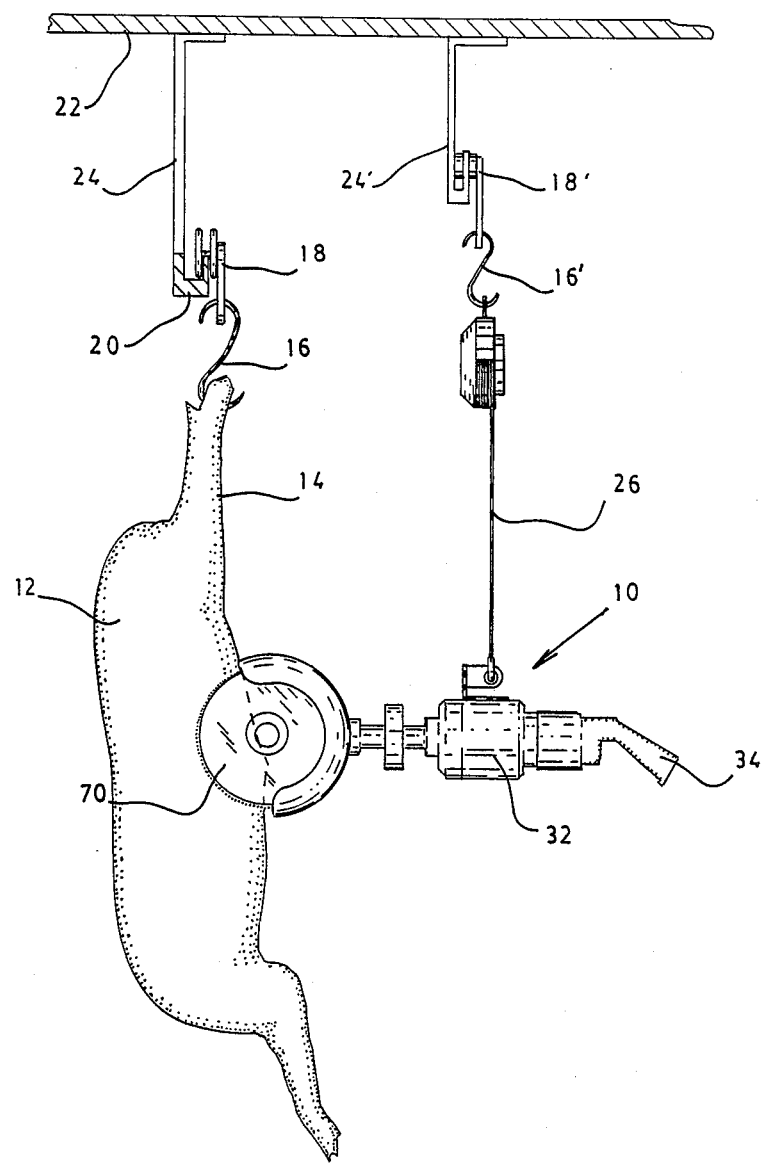
FIG. 1 illustrates an improved butchering saw constructed in accordance with various features of the present invention and shown as installed with a counter-balance mechanism.

A butchering saw particularly suitable for splitting hogs is generally indicated at 10 in FIG. 1. Since the device illustrated in FIG. 1 is shown in operation in connection with splitting a hog 12, it is generally referred to herein as a hog splitter. In hog splitting operations, the hind portion and legs 14 of the hog are supported by a hook 16 mounted on a rolling hook support or carriage 18 of conventional design. This carriage 18 includes a roller and moves along a suspended track 20 which is supported from a ceiling or rafter 22 by a suitable support bracket 24. In this connection, after the splitting or other desired butchering operation is complete the hog 12 can be rolled to another location as desired. Similarly, the hog splitter 10 is supported by the ceiling or rafter 22 through the use of a support bracket 24', a suspended track 20' and a carriage 18' which rolls along the track 20' in a direction perpendicular to the plane of FIG. 1. This carriage 18' supports a small hook 16' which is connected to the hog splitter 10 through a supporting cable 26. It will be noted in FIG. 1 that a counter-balance 28 is provided between the hook 16' and the hog splitter 10 in order to reduce or off-set motion occurring by an operator's use of the hog splitter 10.

As shown in FIG. 1 and in FIG. 2, the hog splitter 10 includes a housing 32 which carries the various components described hereinafter. More specifically, the housing 32 includes a handle portion 34 which is gripped by an operator during use of the splitter 10. This handle 34 is connected to a motor cover 36 which includes a hydraulic motor 38 of conventional design. This motor is connected through ports 40 and 42 with suitable hydraulic connecting hoses (not shown) and a conventional hydraulic pressure source (not shown). Hydraulic fluid passing through ports 40 and 42 in a conventional manner serves to impart and generate rotational forces which drive the power take-off shaft 44 of the motor.

A drive shaft 48 includes a first end portion 50 which is mechanically connected and operatively associated with the power take-off shaft 44 of the motor 38. More specifically, this drive shaft 48 is mounted in the housing 32 such that its end portion 50 is positioned proximate the power take-off shaft 44 of the motor. A suitable mechanical coupling 52 is carried by end portion 50 of the drive shaft. This mechanical coupling 52 is fashioned such that it can be bolted through the use of the externally threaded end portion of the shaft 44 and nut 54 to the mechanical coupling 52. It will be noted in FIG. 2 that the mechanical coupling 52 includes an opening 56 which allows access to the nut 54 for the bolting operation. The connection between end portion 50 of the shaft 48 and the mechanical coupling 52 is completed by a small shaft portion 58 in the depicted embodiment which is externally threaded at its outboard end portion and threadably received within portion 60 of the mechanical coupling 52. The opposite end portion of the shaft 58 is directly connected to end of portion 50 of the drive shaft 48 as shown in FIG. 2.

It will be noted from the above that a suitable means for connecting the power take-off shaft 44 of the motor 38 and the end portion 50 of the drive shaft 48 has been described and illustrated. Alternate embodiments of a suitable mechanical coupling will be obvious to those skilled in the art.

The drive shaft 48 is rotatably driven by the motor 38 and is accordingly rotatably mounted in the housing 32. In this connection, the drive shaft 48 is journaled in bearings 62 and 64 which are mounted at spaced locations in the housing 32 as is shown in FIG. 2. More specifically, bearing 62 is mounted proximate the mechanical coupling 52 which joins the power take-off shaft 44 with the end portion 50 of the drive shaft 44. Bearing 64 is mounted proximate the distal end portion 66 of the housing 32 and supports the outboard end portion 68 of the shaft 48. Thus, when the motor 38 is driven by conventional application of pressurized hydraulic fluid flowing through ports 40 and 42, rotary motion is imparted to the drive shaft 48.

This rotary motion is used to rotatably drive blade 70. More specifically, blade 70 is mounted in a blade assembly generally indicated at 72 which is carried by the outboard end portion 66 of the housing 32. This blade assembly includes a blade guard 74 which assist in shielding the portion of the blade proximate the user. It will be noted that the perimeter of the blade 70, which is substantially circular in outline, includes a plurality of cutting teeth 76 which engage the hog or other animal which is to be split during cutting operations.

Rotary motion is imparted to the blade 70 through the use of a pair of beveled gears 78 and 80, in the preferred embodiment, which are mounted such that their teeth mesh. Beveled gear 78 is mechanically connected to and operatively associated with end portion 68 of the drive shaft 48 proximate the location at which the drive shaft includes an area of reduced cross-sectional outline which is journaled within bearing 64. This portion 68 of the drive shaft serves as the power take-off location for the blade as will be described in greater detail hereinafter. This beveled gear 78 is mechanically connected to beveled gear 80 which has a rotational axis substantially perpendicular to the rotational axis of gear 78. Thus, the axis of rotation of gear 78 is in a plane perpendicular to the axis of rotation of the blade 78. The face 82 of gear 80 is provided with means for mechanically coupling the blade 70 with the gear 80 such that rotation of gear 80 imparts rotational motion to the blade 70. This mechanical coupling is of conventional design and normally includes raised members 84A and 84B which are received in suitable and registering openings in the blade 70. The mechanical connection between gear 80 and the blade 70 is completed by a suitable screw or the like which joins these two members. Suitable parts and details of various mechanical connections and components made herein can be found in the Installation Instruction Manual for Model Nos. 764 and 766, Hog Splitter published by Best and Donovan, 5570 Creek Road, Cincinnati, Ohio 45242.

An important feature of the present invention is to provide means for maintaining a substantially constant rotary motion/momentum or angular velocity of the shaft 48 and the blade 70 during cutting operations in which the load on the blade 70 varies substantially. For example, when cutting through soft tissue the load on the blade is much less than when the blade is used in cutting through bone. These load level variations cause wide swings in the power requirements of the hydraulic pump supplying pressurized fluids through ports 40 and 42 of the hydraulic motor 38. In order to assist and maintain a more constant rotary motion of the drive shaft 48 and the blade 70 during application of various loads, a driving mass mechanism 86 is provided. This driving mass mechanism in the illustrated embodiment is substantially circular in cross-sectional outline and mounted such that its mass is substantially equally distributed about the longitudinal axis of the shaft 48. The mass mechanism 86 is mounted, as shown in FIG. 2, in the enlarged portion 88 of the housing 32 and is preferably press fitted onto end portion 50 of the shaft 48. In this connection, the mass mechanism 86 is provided with a bore 90 having an internal diameter which is substantially equivalent to the external diameter of the end portion 50 of the shaft 48. It will of course be recognized to those skilled in the art that other suitable means can be provided for connecting mass mechanism 86 to end portion 50 of the shaft 48. It will also be noted in FIG. 2 that the mass mechanism 86 is provided with a bore 90 which includes the section 92 of increased cross-sectional diameter having dimensions suitable for receiving the mechanical coupling 52 and the end portion of shaft 48 therein. However, it will be noted that section 92 of bore 90 has a longitudinal axis substantially identical to the longitudinal axis of bore 90 such that the mass distributed radially outwardly from the axis of the shaft 48 is substantially identical FIG. 3 illustrates an alternate embodiment of a driving mass mechanism 86'. It will be noted in the embodiment in FIG. 3, the driving mass mechanism includes a portion 98 having an enlarged cross-sectional outline which is substantially circular. This portion is equally distributed radially about its longitudinal axis. The mass mechanism 86' and the mass mechanism 86 shown in FIG. 2 are preferably fabricated from a substantially rigid material such as steel, iron or the like. The alternate embodiment of the mass mechanism shown in FIG. 3 includes a forward portion 100 of reduced cross-sectional outline which is also substantially circular. A bore 90' extends through the forward portion and the rearward portion of the mass mechanism shown in FIG. 3 and is proportioned for receiving the drive shaft 48 therethrough. Preferably, the mechanical coupling 52 which connects the drive shaft 48 with the power take-off shaft 44 of the motor 38 is positioned external the rearward end portion 102 of the mass mechanism 86'. However, an enlarged section 92' of bore 90' is provided if it is desired for the coupling 52 to be maintained within mass mechanism 86'. Further, bores 104A and B can be provided in a slotted portion 106 of the mass mechanism to receive suitable screws, bolts or the like to secure the mechanism 86' to shaft 48. By mounting coupling 52 inside the mass mechanism 86 and/or 86' the effective length of the splitter 10 can be reduced. It will of course be recognized, that the internal shape of the housing chamber defined by housing 32 can be required to be altered slightly in order to receive the mass mechanism 86' shown in FIG. 3.

Figure 2:
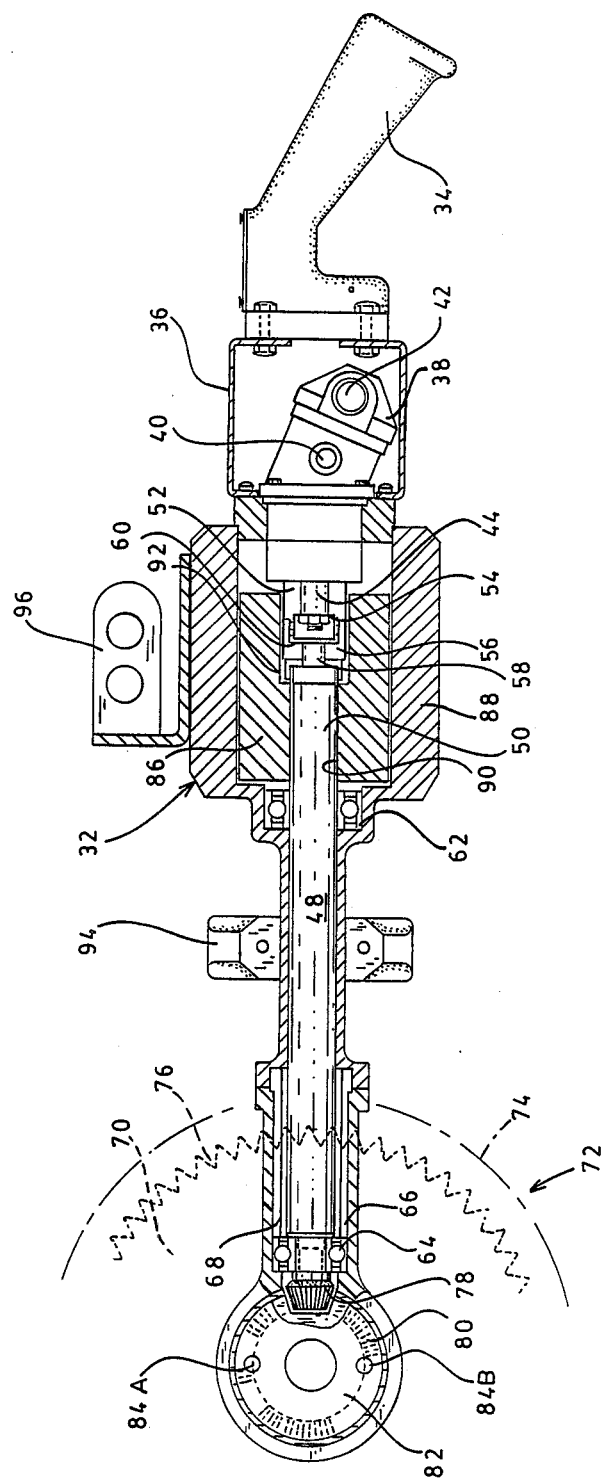
FIG. 2 is a cross-sectional view of the butchering saw which is particularly suitable for hog splitting which is shown in FIG. 1.
Figure 3:
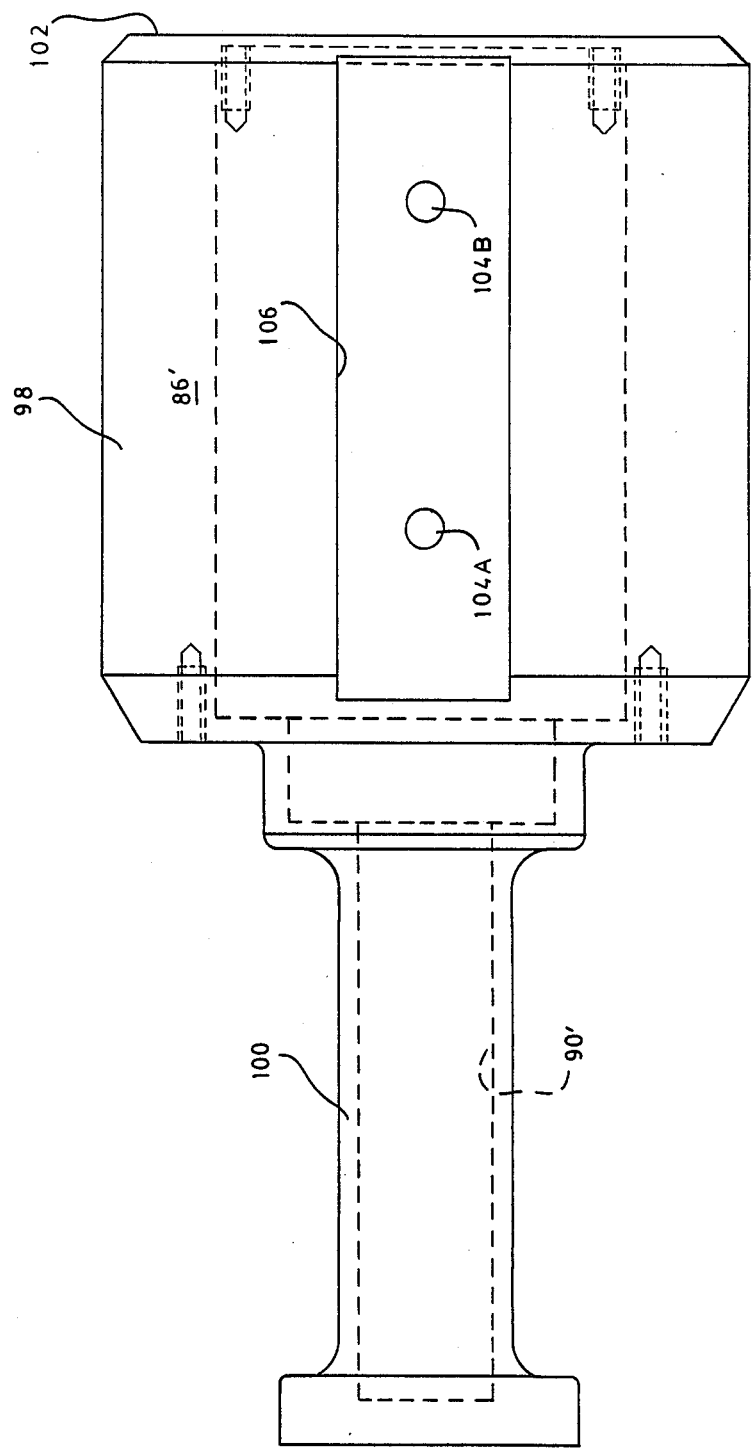
FIG. 3 illustrates an alternate embodiment of a drive mass mechanism used to reduce the pressure peaks required of a hydraulic driving motor when cutting through soft tissue and bone.

It will be noted in FIG. 2 that a suitable handle 94 is mounted proximate the blade carrying portion of the housing 32. Thus, an operator by gripping handles 34 and 94 can maintain control over the hog splitter 10 during cutting operations. Further, a hanger mounting bracket 96 serves to connect the cable 26 with the hog splitter 10. In this connection, the bracket 96 is provided with a pair of openings illustrated in FIG. 2. These openings provide locations at which the lower end portion of the cable 26 can be connected with the hog splitter 10. The openings are spaced along the longitudinal axis of the splitter 10 to provide alternate selections for the cable connection to enhance the balance of the device.

From the foregoing detailed description, it will be recognized that an improved butchering saw particularly suitable for splitting hogs has been provided. The butchering saw is designed to be easily maintained and includes a driving mass mechanism which is operatively associated with the drive shaft of the hog splitter. This driving mass mechanism serves to maintain a more constant rotational velocity-angular momentum during cutting operations in which substantially varying loads are applied to the blade. By maintaining a more constant angular momentum and angular velocity on the drive shaft, the power peaks required to be produced by a hydraulic motor are reduced thereby enhancing the useful life of the hog splitter.

While a preferred embodiment has been shown and described, it will be understood that there is no intent to limit the invention to such disclosure, but rather it is intended to cover all modifications and alternate constructions of a butchering saw and hog splitter falling within the spirit and scope of the invention as defined in the appended claims.

I claim:

1. A hydraulically driven butchering saw having substantially constant rotary momentum during cutting operations during which load on said saw varies substantially due to contrast between bone and soft tissue, which comprises:
    a housing having a first end and a further end;
    a hydraulic motor means mounted within said first end of said housing, said motor means having an output shaft directed toward said further end of said housing;
    means for supplying hydraulic pressure to said motor means;
    a housing extension attached to said further end of said housing;
    a drive shaft extending through, and journaled in, said housing and said housing extension, said drive shaft in alignment with said output shaft of said motor means and having a first end and a further end, said further end extending from said housing extension;
    coupling means within said housing joining said first end of said drive shaft to said output shaft of said motor means;
    rotary saw means having a rotatable circular saw blade operatively connected to said further end of said drive shaft whereby rotation of said drive shaft causes said saw blade to be rotated; and
    a cylindrical weight attached to and surrounding said drive shaft within said housing, said weight having a mass substantially equally distributed around an axis of said drive shaft whereby rotation of said weight with said drive shaft maintains substantially constant rotary momentum of said shaft and said saw blade during operations in which said load on said saw blade varies substantially due to contrasts in cutting bone and soft tissue.

2. The butchering saw of claim 1 wherein said weight is an elongated cylinder and is provided with an axial bore to frictionally receive said drive shaft to attach said weight to said drive shaft.

3. The butchering saw of claim 2 wherein said bore in said weight is enlarged at a first end to receive said coupling means joining said drive shaft to said output shaft of said motor means.

4. The butchering saw of claim 1 wherein said rotary saw means is attached to said housing extension, and said saw blade rotates about an axis perpendicular to said axis of said drive shaft.

5. The butchering saw of claim 1 wherein said housing is provided with a bracket means having apertures, said bracket means providing for the support of said butchering saw from an overhead support means.

6. The butchering saw of claim 1 further comprising a handle means attached to said first end of said housing.

7. A hydraulically driven butchering saw having substantially constant rotary momentum during butchering operations during which load on said saw varies substantially due to contrast between bone and soft tissue, which comprises:
    a housing having a first end and a further end;
    a handle attached to said first end of said housing;
    a hydraulic motor means mounted within said first end of said housing, said motor means having an output shaft directed toward said further end of said housing;
    means for supplying hydraulic pressure to said motor means;
    a housing extension attached to said further end of said housing,
    a drive shaft extending through, and journaled in, said housing and said housing extension, said drive shaft being in alignment with said output shaft of said motor means and having a first end and a further end, said further end extending from said housing extension;
    coupling means within said housing joining said first end of said drive shaft to said output shaft of said motor means;
    rotary saw means, having a rotatable circular saw blade, operatively connected to said further end of said drive shaft, said circular saw blade mounted so as to rotate about an axis perpendicular to an axis of said drive shaft, whereby rotation of said drive shaft causes said saw blade to be rotated; and
    an elongated cylindrical weight attached to and surrounding said drive shaft within said housing, said weight provided with a bore having a first portion of a dimension for frictional engagement with said drive shaft whereby rotation of said drive shaft results in rotation of said weight, said bore having a second portion to receive said coupling means, said weight having a mass substantially equally distributed around said axis of said drive shaft whereby rotation of said weight with said drive shaft maintains substantially constant rotary momentum of said shaft and said saw blade during butchering operations in which said load on said saw blade varies substantially due to contrasts in densities of bone and soft tissue.

8. The butchering saw of claim 2 wherein said housing is provided with a bracket means intermediate said first and further ends proximate a center of gravity of said saw, said bracket means provided with apertures, said bracket means providing for the support of said butchering saw from an overhead support means.

* * * * *